(No Model.)
M. L. HAYWARD.
WHIFFLETREE HOOK.
No. 564,016. Patented July 14, 1896.
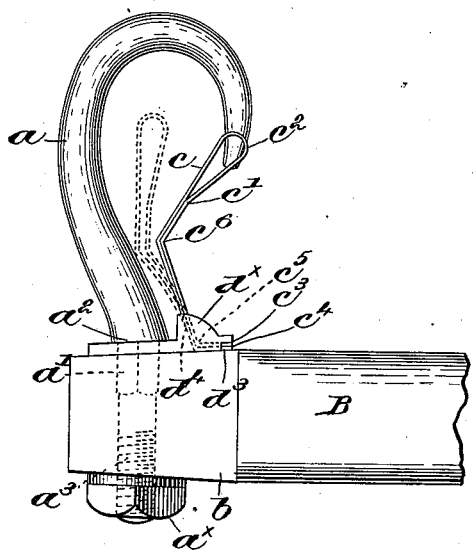
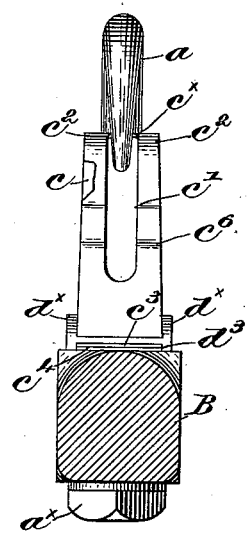
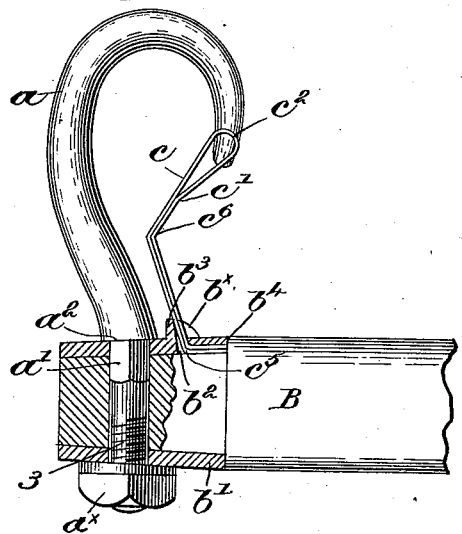
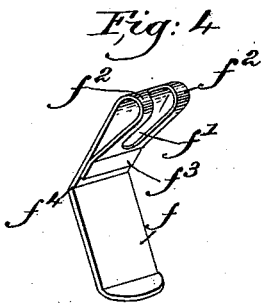
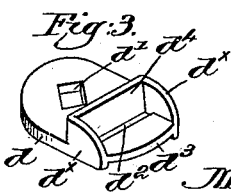
Witnesses.
Edward F. Allen.
Thomas J. Drummond.
Inventor:
Martin L. Hayward.
by Crosby & Gregory.
attys

United States Patent Office.

MARTIN L. HAYWARD, OF NORTH READING, MASSACHUSETTS.

WHIFFLETREE-HOOK.

SPECIFICATION forming part of Letters Patent No. 564,016, dated July 14, 1896.

Application filed April 18, 1896. Serial No. 588,058. (No model.)

*To all whom it may concern:*

Be it known that I, MARTIN L. HAYWARD, of North Reading, county of Middlesex, State of Massachusetts, have invented an Improvement in Whiffletree-Hooks, of which the following description, in connection with the accompanying drawings, is a specification, like letters on the drawings representing like parts.

This invention relates to whiffletree-hooks, and more particularly that class of hooks forming the subject-matter of United States Patent No. 548,874, granted to me October 29, 1895; and my present invention has for its object the production of a whiffletree-hook embodying various novel and useful features in its construction, as will more fully appear in the following specification and claims.

Figure 1, in elevation, represents a trace-hook embodying my invention applied to a whiffletree, a portion of one end thereof being shown. Fig. 2 is an inner edge view of the hook shown in Fig. 1, with the whiffletree in section. Fig. 3 is a detached perspective view of one form of spring-holder. Fig. 4 is a perspective view of a modified form of spring; and Fig. 5, in elevation and partially in section, represents a modified form of spring-holder to be described.

I have shown herein a suitable whiffletree-hook, the body $a$ of which is of usual or desired construction, and provided with a shank $a'$, the body $a$ being reduced to form a shoulder $a^2$ at its junction with the shank. For some distance from the shoulder the shank is squared (see Figs. 1 and 2) with the diagonals of a cross-section extending transversely to and in the direction of the length of the whiffletree B, respectively.

I have found by experience that the greatest lateral strain on the hook-shank is in the direction of the length of the whiffletree, and by making the shank as described I strengthen it against such strains, the greatest thickness of the shank being disposed in such direction.

The end of the shank is screw-threaded at $a^3$, Fig. 2, to receive a suitable retaining-nut $a^\times$, the shank being passed through a suitable hole in the whiffletree, and as herein shown through holes in a metal collar or ferrule $b$, surrounding the end of the whiffletree.

To prevent accidental removal or unhooking of the trace, I employ a spring composed of a strip $c$, of spring metal, slotted longitudinally at $c'$ and bent over upon itself at $c^2$, forming a seat for the point of the hook, the two ends $c^3$ $c^4$ of the spring being bent laterally at $c^5$.

A spring-holder is shown separately in Fig. 3, as a metallic plate $d$, having an opening $d'$ for the shank $a'$ of the hook, a transverse slot $d^2$, through which the lower part of the spring passes, and preferably a recess $d^3$ in its under side to receive the bent and overlapping ends $c^3$ $c^4$ of the spring. When the holder is in place, retained by the shoulder $a^2$ of the hook upon the whiffletree, the spring ends are firmly held in the recess $d^3$ against the whiffletree, or, as in Fig. 1, against the ferrule $b$.

Between its free end and its point of attachment the spring is bent, as at $c^6$, at preferably an obtuse angle, and a supporting-abutment $d^4$ is formed on the holder $d$ back of the slot $d^2$, acting upon the spring near its base when bent, and strengthening it. When the spring is bent into dotted-line position, Fig. 1, the corner or angle $c^6$ bears against the inner side of the hook-body, and forms a new fulcrum for the outer ply $c$ of the spring, the inner ply separating therefrom under the bending stress, and as it is held at its end $c^4$ it tends to prevent falling away of the spring from the hook-point by constant use, and also increases the effectiveness of the spring in operation.

By supporting the spring at the point $c^6$ when flexed, a considerable strain is removed therefrom, and its life increased.

The rounded bends $c^2$ prevent marring or cutting of a trace, and they form with the upper end $c^\times$ of the slot, in Fig. 2, a most effective housing for the point of the hook and by reason of the inclination of the spring from the bend or angle $c^6$ to the hook-point, the removal of a trace or chain link is facilitated.

Instead of continuing the two plies of the spring superposed throughout their length, I may simply slot the strip $f$, Fig. 4, at $f'$, and bend it over upon itself at $f^2$, the end of the bent-over portion $f^3$ extending to about the intermediate angle $f^4$. This spring is adapted for light work, but of course the pull of the inner ply when the spring is flexed is absent, and the spring tends to break down sooner than will the spring shown in Figs. 1, 2, and 5.

In Fig. 5 I have shown the ferrule or collar $b'$ as provided with a transverse spring-receiving slot $b^2$, an abutment $b^3$, and a recess $b^4$ in its upper side to receive the ends of the spring, holding them against the whiffletree and dispensing with a separate spring-holder.

I prefer to provide the holder $d$ or the ferrule $b'$ with parallel ears $d^\times$ $b^\times$, respectively, at the ends of the spring-receiving slots, to prevent any displacement of the spring in the direction of its width.

In any event, the spring is secured at one side and independent of the hook or its shank, and all tendency to weaken the spring by making shank-receiving holes therein is obviated.

My invention is not restricted to the precise construction shown, nor is the application of the spring restricted to "side-draft" hooks, as it is equally applicable to central-draft hooks. So, too, other forms of retaining-springs may be used and secured in place in the manner I have herein shown and described.

Having fully described my invention, what I claim, and desire to secure by Letters Patent, is—

1. A hook provided at its base with an attaching-shank, an upturned spring having at its free end a housing for the hook-point, and a holder for the spring to secure its lower end in place at one side of and out of contact with the hook, substantially as described.

2. A hook having an attaching-shank, an upturned spring turned over upon itself and slotted to form two bends to inclose the hook-point, and means located at one side of the hook-base to secure the lower end of the spring in place out of contact with the hook, substantially as described.

3. A hook provided at its base with an attaching-shank, an upturned spring having at its free end a housing for the hook-point, and an independent holder for the spring having an abutment to support the latter when flexed, substantially as described.

4. A hook having a squared shank, two opposite edges thereof being in the plane of the hook-body, a spring bent at an angle between its ends and having a housing at its free end for the hook-point, and a slotted holder for the spring, the holder having an opening therethrough for the hook-shank and being retained in place thereby, substantially as described.

5. A hook having an attaching-shank, and an upturned spring secured at its lower end at one side and independent of the hook-base, said spring being bent at an angle between its ends inward and toward the hook-body, whereby when the spring is flexed said bend will engage and be supported by the hook, substantially as described.

6. A hook provided at its base with an attaching-shank, a spring-holder independent of the hook and having a supporting-abutment, and an upturned hook-spring secured in said holder and bent between its ends toward the hook-body, whereby when the spring is flexed it will be successively supported by the abutment and by the body of the hook, substantially as described.

7. A holder for whiffletree-hook springs, transversely slotted to receive the spring and recessed beneath its top for the outwardly-turned spring end, a supporting-abutment adjacent the transverse slot, and ears at the ends of said slot, to prevent movement of the spring laterally, substantially as described.

In testimony whereof I have signed my name to this specification in the presence of two subscribing witnesses.

MARTIN L. HAYWARD.

Witnesses:
JOHN C. EDWARDS,
AUGUSTA E. DEAN.